Dec. 16, 1958  G. BACHMANN  2,864,195
PHOTOGRAPHIC FISHING APPARATUS
Filed Oct. 16, 1957
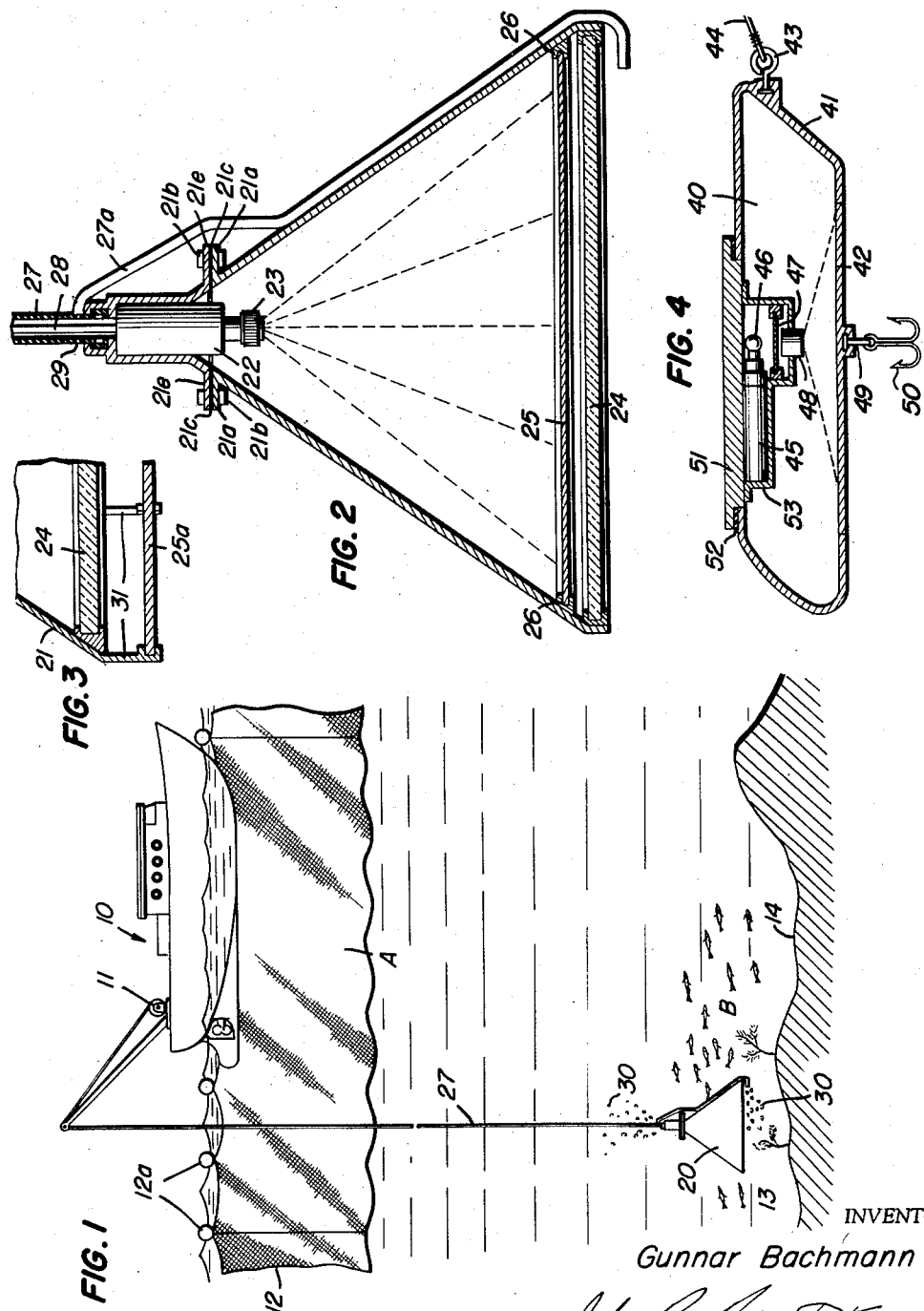
INVENTOR
Gunnar Bachmann
BY John B. [signature]
ATTORNEY

United States Patent Office 2,864,195
Patented Dec. 16, 1958

2,864,195

PHOTOGRAPHIC FISHING APPARATUS

Gunnar Bachmann, deceased, late of Reykjavik, Iceland, by Gudjon Bachmann, administrator, Forest Hills, N. Y.

Application October 16, 1957, Serial No. 690,488

6 Claims. (Cl. 43—4)

This invention relates to a method and apparatus for fishing and more specifically to a method and apparatus for attracting fish to a zone in which they may more readily be caught.

An object of this invention is to provide a method and apparatus by which fish may be enticed from one locality to another by the use of effective visual attraction.

Another object of this invention is the provision of a practical and reliable method and apparatus for luring fish to a point in the water where they may be successfully caught, the method and apparatus lending themselves to the presentation of any of a wide variety of attractive effects free from the problems of obtaining and storing supplies of bait of the edible, living type.

A still further object of this invention is to lure fish from the bottom of a body of water by the use of an apparatus which provides a visual attraction serving to entice the fish to a higher level in the water where they may be caught.

Other objects of this invention in part will be obvious and in part will be set forth hereinafter.

The invention therefore resides in the method and apparatus, and in the interrelation of the steps undertaken in execution of the method, and of the structural features of the apparatus as herein described, the scope of the application of which is indicated in the following claims.

In the accompanying drawing representing embodiments of apparatus having features in accordance with the present invention and at the same time representing certain forms of apparatus by which the present method may be practiced:

Figure 1 depicts schematically an assembly of fishing equipment including a boat, net and lure in fishing environment;

Figure 2 is a vertical section of the lure apparatus appearing in Figure 1;

Figure 3 is a vertical section of a modification of the lure appearing in Figure 2; and Figure 4 is a vertical section of an embodiment of the lure for use as a casting plug.

As conducive to a clearer understanding of certain features of the invention here concerned, it may be noted at this point that success in commercial fishing depends upon the obtainment of highest possible yields per unit of time spent fishing. Performance at a high level of efficency demands fishing methods and apparatus which will afford on-the-spot solutions to the many problems encountered during an expedition, thereby enabling large quantities of fish to be taken which might otherwise be lost.

In an effort to overcome some of the adverse conditions tending to prevent the capture of fish and in order to influence favorably the location of schools of fish, it has been previously suggested that sound waves be emitted beneath the water's surface, lights be played on or lowered below the surface of the water, electric current be run into the vicinity of the fish, et cetera. It remains, though, that a large source of fish regularly remains untapped because it has not been economically feasible to attract the fish. These fish continue to elude the attempts of fishermen to catch them by locating themselves in areas of the ocean or other waters where the depth of the water or other prevailing circumstances frustrate attempts to gather the fish by available techniques.

There are many reasons which influence the location of fish, as for example, water temperature, pressure, amount of sunlight, bottom growth, and topography, et cetera. One quite significant factor is the presence, or absence, of the material on which the fish feed. Take for instance the herring and fish of that family such as menhaden, shad, and sardines. These fish feed principally on plankton, a collective term for the minute vegetable and animal life of the sea including diatoms, peridinians, brown and blue-green algae, and the like. In the life cycle of these organisms they rise first towards the surface of the water and then as their vitality and activity decrease they tend to sink toward the bottom and form an accumulation at the lower regions of the sea. Now the schools of herring and other fish which feed upon plankton have been observed to rise to the surface when an abundance of that substance is present there. Very often however no such food supply is available near the surface, and the herring will then lie close to the bottom where the plankton is more concentrated. As a result of this pattern the herring are inaccessible for considerable periods of time, being out of range of nets, traps, and other fishing devices.

An outstanding object of this invention accordingly is the provision of a method and lures which produce attraction from a durable, practical source and whereby commercial fishermen and for that matter sportsmen or other individuals who are fishing in salt water or fresh water may successfully attract fish to a region in the water where the fish are quite readily caught.

In the embodiment of this invention represented in Figure 1 of the accompanying drawings, there is provided a fishing vessel 10, with a crane and rotatable winch 11 equipped with a suitable motor or hand crank and drive for feeding out and recovering hollow cable 27. Suspended from the lower end of cable 27 is luring device 20. Area A designates a region in the water from which fish may be taken with nets or the like, while area B designates a region where large scale fishing is relatively difficult. A fishing net 12 such as one which may be controlled by suitable lines from boat 10 is suspended such as with the aid of buoys 12a into area A and for example is disposed somewhat to one side of cable 27 and lure 20.

Referring now to figure 2 which shows a more detailed view of the lure apparatus 20, there is provided a pyramidal or conical housing 21, made for example of steel, which is substantially water tight and capable of withstanding high pressure. Inside the apex of the housing there is mounted a motion picture projector 22 loaded with film and having a lens element 23 directed for optical projection toward the base of the conical housing 24. The base 24 is made of heavy transparent plate glass or other strong transparent material. Situated between projector 22 and base 24 is a translucent screen 25 suitably mounted in brackets 26 and arranged in a plane substantially parallel to base 24. The apex of housing 21 may be removed for access to the projector such as by removing bolts 21b which extend through flanges 21a and 21e on the adjacent portions of the housing and through a sealing element 21c, the latter normally retaining the housing sealed at the joint when bolts 21c are tight.

Current is supplied to the projector 22 through an insulated electrical conductor 28 enclosed within hollow cable 27. The hollow cable also is connected with an air pump on board boat 10. Apertures 29 in the cable wall provide an exit for air pumped through the interior of the cable. Some or all of these apertures may be connected to one or more air duct extensions which empty into the water under and across screen 25.

In Figure 3 there is shown a lure similar to the one in Figure 2 with a modification in the placement of the optical screen. Here brackets 31 on housing 21 hold the screen 25a in position outside the bottom of housing 21 and substantially parallel to the window wall 24. The transparent wall 24 then lies between the projector and the screen 25a and the light rays transmitting the image pass through wall 24 and onto screen 25a.

As illustrative of the practice of the method and operation of apparatus in accordance with this invention consider the following typical fishing operation. An animated photographic film in natural color is first prepared depicting material attractive to the fish sought. If the fish to be caught is herring, the film advantageously would be a representation of plankton organisms or other attraction. This film is then installed in the projector 22 which is mounted in housing 21 and lens 23 is adjusted to focus a sharp image on screen 25 in Figure 2. After a school of fish 13 has been detected by echo-sounding or other means, the apparatus 20 is lowered beneath the water on cable 27 by means of winch and crane 11. When the apparatus is in the vicinity of the fish in area B in Figure 1, the projector is started and an image of plankton falls on screen 25. Since this screen is translucent the image thereon is plainly visible on the surface of the screen facing the transparent wall 24. The fish are then attracted to the representation of plankton which can be seen by them through wall 24. Compressed air meanwhile is forced through cable 27 so that bubbles 30 issue in front of the screen thus adding to the life-like appearance of the lure by simulating the air bubbles emitted from living organisms. After a period of time the lure is slowly retrieved by reeling in cable 27, thereby raising apparatus 20 to area A, Figure 1, at which point a net or nets 12 are utilized to catch the fish. Due to the strong herd instinct of herring and like fish even a relatively small number of them, attracted to the lure and which follow it in its ascent to area A, will serve to lead an entire school of herring into this region enabling a large number of the fish to be taken.

The modified apparatus of Figure 3 also is effectively employed in the illustrative operation described above, it being understood however that the attractive image would fall on screen 25a located outside of the housing 21.

In the modified embodiment represented in Figure 4 a lure 40 is provided and used with a casting rod or the like. The lure is hollow having a water tight wall 41 which at least in part is translucent to afford a viewing screen area 42. An eyelet 43 or other means for attaching the lure to a fish line 44 is situated at one end of the lure and is secured to wall 41. A hook 50 depends from lure wall 41 such as by affixation to an eyelet 49 attached directly to the wall 41 in the screen area 42. A small optical projector 53 is situated inside the lure and includes a light bulb 46 powered by a battery 45, the bulb being in optical alignment with a projecting lens 48 focused on screen area 42. An optical slide 47 which carries representation of a object attractive to fish is disposed in a suitable holder between the bulb light source and lens of the projector. The rays of light on passing through slide 47 are projected by lens 48 to produce an image of the attractive object on the translucent screen area 42 of the lure wall. This image is visible outside the wall of the lure and attracts fish to the vicinity of hook 50. In attempting to devour or to battle with the image on the screen the fish is engaged by the hook 50, at which time the lure is reeled in and the fish is captured. The top side of wall 41 conveniently has a water tight closure plug 51 on the inner face of which projector 53 is mounted. A sealing rim 52 of the plug such as of soft rubber snugly fits against the corresponding rim of the aperture in wall 41 to close the inside of the lure water tight. Thus, plug 51 may be removed when desired to give access to the projector so that a different slide 47 may be inserted in the slide holder for projection onto the screen.

It should be noted that the projection systems employed in the various embodiments of the apparatus set forth in Figures 2, 3, and 4 may in principle be interchanged among the structures. For example, the optical system of the lure of Figure 4 in which a translucent portion of the projector housing also functions as a screen could be adapted to the housing of Figures 2 and 3, in which case screen 25 or 25a would be eliminated and transparent wall 24 would be replaced by a translucent member. Conversely the interior screen of Figure 2 or the exterior screen of Figure 3 are at times incorporated into the lure of Figure 4 necessitating the replacement of the translucent portion 42 of the housing with a transparent window and adding a screen and support for the same.

Thus, it will be seen that this invention provides a fishing method and apparatus by which the various objects noted herein together with many thoroughly practical results are successfully achieved. It will be seen that the optical transparencies used contribute ease in producing desired lure effects, and that it is entirely feasible to make and store a variety of different transparencies so that they will be available to the fisherman when selectivity is desired.

Although the advantages of this method and apparatus are quite strikingly displayed in a deep sea environment, the invention also applies with success in any fishing operation whether conducted in salt or fresh water, deep or relatively shallow water.

Nor is it essential to this invention that the lure apparatus be moved frome one region to another to lure the fish. In practice the lure may be introduced into the water at a given level at which the fisherman has provided means for catching fish, and it may be maintained at that level until fish are attracted to the lure.

The method of projection and the type of the representations may also be varied to include still pictures and motion pictures, black and white pictures and colored pictures, whether photographic or drawn as by an artist.

Also contemplated is the use of representations of a wide variety of substances attractive to fish, such as worms, flies, frogs, minnows, silversides, and other small fish, crustaceous, mollusks, sand eels, hydroids, sea anemones, and any other food values, and even representations such as color designs, and designs producing motions to which fish are attracted for any of a variety of reasons.

Since this invention may find application in a variety of embodiments and since many changes may be made in the embodiments set forth above, it will be understood that all matter described herein is to be interpreted as illustrative and not as a limitation.

I claim:

1. A method of fishing which comprises providing an optically projective representation of an object which is known to attract the fish sought, introducing said representation into an optical projector, providing by optical projection with the aid of said projector an image of said object in the environment of the fish until fish from said environment are attracted to the image and catching fish so attracted.

2. A method of fishing which comprises providing an optically projective representation of an object which is known to attract the fish sought, introducing said representation into an optical projector, providing by optical projection, with the aid of said projector, an image of said object and simultaneously releasing air bubbles in the environment of the fish until fish from said environment are attracted to the image and bubbles and catching fish so attracted.

3. A fish lure comprising in combination a water tight housing, said housing having a light-transmitting wall and an optical screen, an optical projector inside said housing, an optically projective representation of an object suited to give the image of an object attractive to fish on projection by said projector, the optical screen and the light-transmitting wall of said housing being aligned with said projector so that said attractive image on projection falls on said screen and is visible to fish outside the housing.

4. A fish lure comprising in combination a water tight housing having an optically transparent wall, an optical projector inside said housing, an optically projective representation suited to give the image of an object attractive to fish on projection by said projector, and an optical screen inside said housing and so aligned with said projector and transparent wall that said attractive image when on the screen is visible to fish outside said housing through said wall.

5. A fish lure comprising in combination a water tight housing having an optically transparent wall, an optical projector inside said housing, an optically projective representation suited to give the image of an object attractive to fish on projection by said projector, and an optical screen outside said housing and supported by the same in alignment with said projector and transparent window for said image to fall onto said screen and attract fish.

6. A fish lure comprising in combination a water tight housing having a translucent, optical screen for a wall, an optical projector inside said housing, and an optically projective representation of an object attractive to fish for giving an image of said object on projection by said projector onto said screen, said image being visible outside said housing.

No references cited.